March 30, 1954 J. SCHMIDT Re. 23,810

PROCESS AND APPARATUS FOR CONCENTRATING SOLUTIONS

Original Filed Feb. 2, 1950

INVENTOR.
Joachim Schmidt
BY
Hudson & Young
ATTORNEYS

Reissued Mar. 30, 1954

Re. 23,810

UNITED STATES PATENT OFFICE 23,810

PROCESS AND APPARATUS FOR CONCENTRATING SOLUTIONS

Joachim Schmidt, Konigsfeld (Schwarzwald), Germany, assignor, by mesne assignments, to Phillips Petroleum Company, Bartlesville, Okla., a corporation of Delaware Original No. 2,617,274, dated November 11, 1952, Serial No. 141,881, February 2, 1950. Application for reissue May 28, 1953, Serial No. 358,223. In Switzerland February 9, 1949

23 Claims. (Cl. 62—124)

Matter enclosed in heavy brackets [ ] appears in the original patent but forms no part of this reissue specification; matter printed in italics indicates the additions made by reissue.

This invention relates to a process of concentrating liquids out of weak solutions, and to an apparatus to carry out the process. More particularly, it relates to a process which consists in freezing the weak solution to be concentrated, thereby transforming the solution in a mixture of solid crystals formed from the diluent, and a concentrated liquid, and in separating the concentrated liquid from the crystals. The separation is achieved by introducing a suitable liquid into the mixture, and by displacing by means of this liquid the concentrated liquid.

In processes of this character, displacing liquids are preferably used which correspond to the crystals formed due to the freezing action.

As far as aqueous starting solutions are concerned, they are transformed, when subjected to freezing, into a mixture of ice crystals and a concentrated liquid. The displacement liquid is water which is introduced into the mass of ice and concentrated liquid at an approximate temperature of 0° C.

Attempts to use processes of the type referred to to concentrate liquids out of weak solutions have already been made, but all of them have proven unsatisfactory, the reasons being, for instance, that no pressure or static pressure only was used to move the displacing liquid through the mass to be treated, thus effecting a slow and impractical displacement action, or that the installations suggested were complicated and inefficient. The primary object of my invention is, therefore, to generally improve processes for the concentration of liquids out of weak solutions, more particularly, to simplify, cheapen, and speed up the concentration.

To the accomplishment of the foregoing main object and other more detailed objects which will hereinafter appear, my invention consists in a method and in an apparatus for the concentration of liquids out of weak solutions, as are described in the following specification and sought to be defined in the claims.

The specification is accompaned by a drawing in which.

Figure 1:
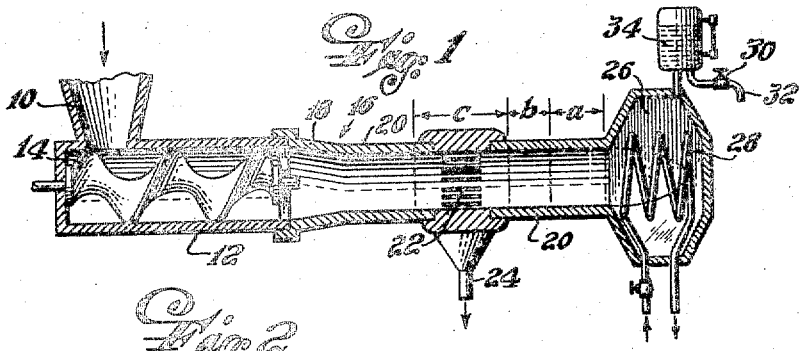
Fig. 1 is a partially sectioned side elevation of one form of the apparatus embodying features of my invention.

Referring to the drawing, and more particularly to Fig. 1, a finely divided mass of ice crystals and fruit juice is fed through a hopper 10 into a horizontally arranged tube 12. The feed entry port is provided at one end of this tube. The starting material, which has been prepared outside of the apparatus by freezing a weak solution of fruit juice, constitutes a mixture of ice crystals and concentrated fruit juice, the diluent having been frozen out. The frozen mass is moved through the tube 12 by means of a screw conveyor 14. Coupled with the tube 12 is another tube 16 comprising a frusto-conical portion 18 and a cylindrical portion 20. The portion 18 is given a conical shape for the purpose of compressing the ice-juice mass. The cylindrical portion 20 is provided with narrow longitudinal slots 22 within a certain boundary to permit the escape of concentrated juice which is withdrawn at 24.

At its other end, the tube portion 20 is connected to a melting chamber 26 heated by a heating coil 28, preferably a condenser coil of a refrigerating plant. The ice-juice mass, after being pressed through the tubes 12, 18 and 20, and after being freed from the juice, forms a body of ice which enters the melting chamber. The ice bar entering the melting chamber is melted, and the melting water collects in the chamber. The apparatus shown is designed for continuous operation so that a continuous ice bar is forced into the melting chamber, and continuous melting takes place. Surplus water is removed from the melting chamber with the aid of a spring-loaded relief valve 30 through the pipe 32. A pressure air vessel 34 partly filled with air is interposed between the chamber 26 and the valve 32. The pressure compensation caused by the pressure air vessel renders it possible to maintain a constant pressure in the melting chamber even though the relief valve owing to its construction operates at intervals.

As the ice bar is pressed into the melting chamber which is filled with water of approximately 0° C., water is forced from the melting chamber into the tube 20 countercurrent to the motion of the ice-juice mass. First the water displaces the air [pressure] *present* in the spaces between the ice crystals, and then juice adhering to the ice crystals. The water acts as a displacing liquid which pushes the juice ahead, thus being developed a water-ice zone a, a transition zone b, and a zone of concentration c. It is within the zone c that the aforementioned slots 22 are provided. The concentrated liquid escapes continuously through these slots.

It will be clear that the whole of the melting water must not be forced through the ice-juice bar. The amount to be used as a displacing liquid depends on the desired concentration of the juice. Accordingly, more or less melting water is released through the pipe 32.

Figure 2:
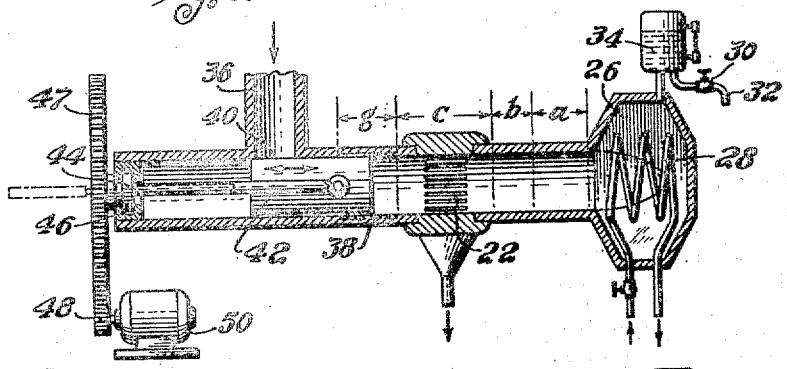
Fig. 2 is a partially sectioned side elevation of a modified form.

The apparatus shown in Fig. 2 differs from that of Fig. 1 mainly in the provisions for the feed of the ice-juice mass. The mass, again, for instance, a fruit-juice mass, is introduced through a pipe 36, in which a preliminary compression may take place, and is pressed through a tube 38 by means of a piston 40. The piston is connected with a threaded rod 42 and is actuated by a screw nut 44 rotatably supported in a bearing 46. The screw nut 44 is rigidly connected with a gear 47 which meshes with a pinion 48, the latter being driven by a motor 50.

The direction of motion of the piston 40 can be changed by reversing the motor. During the return motion of the piston 40, care has to be taken to prevent the ice-juice body from being pushed by the pressure prevailing in the melting chamber 26, the pressure amounting, for instance, to 2 to 6 atmospheres above atmospheric pressure. A simple way of preventing such a pushing-back action is to roughen the inner surface of the tube 38 within the region g, for example, by providing the inner circumference g with a fine thread.

In the position illustrated in Fig. 2, the piston 40 is shown in its furthermost front position. The motor 50 will promptly return the piston to its initial position over the pinion 48 and the gear 47. Then such a quantity of ice-juice mixture is introduced through the pipe 36 as fills the whole cross section of the pipe 38 in front of the piston 40. By again reversing the direction of rotation of the motor, the piston is caused to advance again and to push on the newly introduced mixture onto the body of ice-juice already present in the tube 38. The pushing surface of the advancing piston 40 passes by the entrance port of the pipe 36 so that, due to the pressure exerted on the piston, no diversion of any ice-juice mass from its straight course into the pipe 36 takes place. In order to move the ice-juice bar towards the melting chamber 26 as slowly as desired, the motor speed is regulated accordingly.

Figure 3:
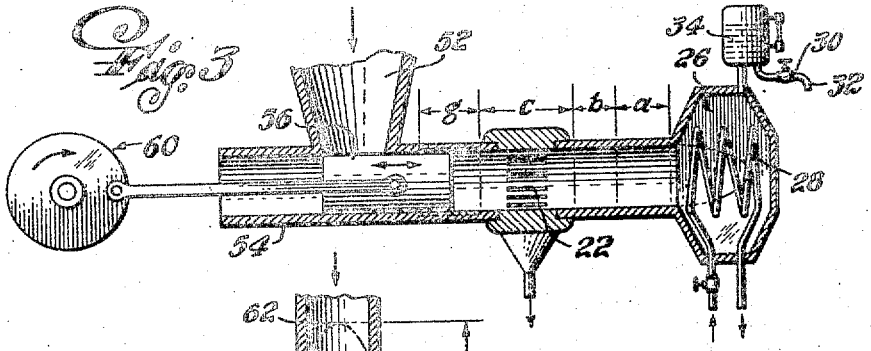
Fig. 3 is a partially sectioned side elevation of still another modification.

In the apparatus of Fig. 3, ice-juice mass is fed through a hopper 52 into the tube 54 and is pushed by a piston 56 operated to and fro by a crank mechanism generally designated 60.

Figure 4:
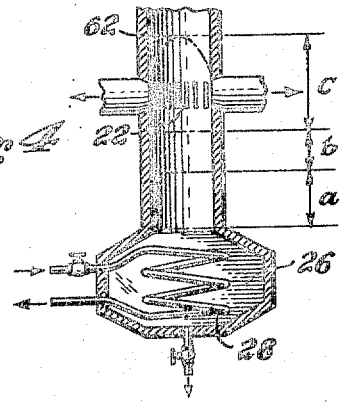
Fig. 4 illustrates a further modification.

Referring now to Fig. 4, the pipe 62 through which ice-juice mass and water as the displacing liquid are forced countercurrent to one another is vertically arranged. The pipe 62 is connected at its bottom end to the melting chamber 26. The frozen mass is introduced at or near the top of the pipe 62 and is forced downwardly. The ice body, after being freed from the juice, moves on into the melting chamber 26. The displacing liquid is forced upwardly.

The apparatus of my invention is advantageously protected from heat losses by insulation. The tube in which the separation of the concentrated liquid from the solid constituent of the mixture takes place, and the conduits for the mixture to the tube, are to be insulated above all.

The preparation of the ice-liquid mass which is of a porridgelike or pastylike viscosity can be effected in different ways, for instance, by bringing the initial solution into contact with refrigerating surfaces, and continuously scraping off the ice formed. When concentrating, for instance, fruit juice, the preliminary treatment results in a mass of ice crystals covered with a thicker or thinner layer of fruit juice, whereas the spaces between the individual crystals are filled with air. The presence of such air interstices has proved to be advantageous when working according to my invention.

The average size of the ice crystals may be as big as approximately 1.5 sq. mm., for instance, between about 0.3 and about 1.0 sq. mm. Within this range, the size of the ice crystals should be as uniform as possible.

The temperature of the crystal-liquid mixture which is introduced into my apparatus has a temperature of about 1 to 25° C. below the freezing or solidification point of the frozen [of] *or* solidified constituent of the mixture introduced. In the case of frozen fruit juice, the temperature is about 1 to 25° C., preferably 15 to 20° C., below zero.

The displacing liquid is introduced at a temperature slightly above the freezing point of the displacing liquid. Water, for instance, is introduced at a temperature close to 0° C. Upon pressing a displacing liquid, such as water, into the ice-liquid mass, first the liquid present between the crystals, for instance, fruit juice, is somewhat diluted. Then, as more water is pressed in, the juice is pushed into an adjacent colder zone whereby, due to water being increasingly crystallized out, the concentration increases step by step, and a concentrated liquid is formed that is continuously removed.

The process of my present invention is not restricted to the preparation of concentrated liquids out of solutions diluted with water, but is applicable to the concentration of all kinds of liquids containing a solvent capable of being removed by solidifying and freezing operations, respectively. The field[s] in which my invention can be practiced is extremely large. The invention is suitable for producing concentrated products of fruit juices, juices of vegetables, and other juices of a vegetable nature, for instance, juices of medicinal plants, of extracts of plants and parts of plants, such as blossoms, flowers, etc.

The new process is particularly suitable for handling pure and clear solutions. Sometimes a preliminary purification has proved to be advantageous. If orange juice, for instance, is to be concentrated, it is advisable first to remove the solid ingredients of the juice, such as small particles of the juice cells and so on.

My process is also suitable for the concentration of salt solutions of any kind, of liquids of an animal nature, such as whey and the like. Emulsions, e. g. skim milk, plant milk, such as caoutchouc milk, natural and artificial latex, and similar substances can be concentrated according to my invention.

The process and apparatus of my invention prevents all valuable substances of the initial material from becoming lost during the concentrating operation. Thus, the concentrated liquid has all properties and activities of the initial liquid as to taste, flavor, efficiency, etc. Concentrated fruit juices when prepared according to the present invention, e. g. apple juice, orange juice, lemon juice, have the pleasant taste and flavor of freshly pressed out juices. Thus, my process and apparatus are particularly suitable for the concentration of substances containing ingredients which are liable to decomposition or are highly volatile. The preparation of medicines, perfumes, and similar products offers important applications of the present invention.

My process may be executed in such a way that certain undesirable substances are eliminated without impairing the desired valuable substances. Especially substances which are difficultly soluble at low and very low temperatures, respectively, can be easily eliminated by withdrawing them with the concentrated liquid, whereupon they are separated from the liquid phase by simple operations, e. g. by siphoning them off or by decanting or centrifuging. For instance, it is possible to eliminate certain substances contained in wine while concentrating it, and thus to obtain a concentrated product which surpasses the initial wine in taste and flavor. Concentrated wines thus produced are suitable for many purposes, e. g. as elixirs, strengthening remedies, and admixtures for stimulating agents and the like.

My process can also be used as a preliminary step in the drying of materials by freezing. It is possible to transform, for instance, an initial solution of about 5 to 10% into a concentrated liquid containing 50% of the valuable substances or more, and subsequently to dry this concentrated liquid by freezing.

It is believed that the method of my invention, as well as the construction and operation of the apparatus for practicing the invention, and the many advantages thereof, will be fully understood from the foregoing detailed description thereof, and it will be apparent that while I have shown and described my invention in a few number of forms only, many changes and modifications may be made without departing from the spirit of the invention defined in the following claims.

I claim:

1. In a process of concentrating liquids out of weak dilutions, the steps of subjecting the weak dilution to a freezing action, thereby crystallizing the diluent and concentrating the liquid, preparing a finely divided mass of the crystals obtained and of the concentrated liquid, moving said mass through a displacement zone, evenly distributing a displacing liquid over the cross section of said mass at the exit end of the displacement zone, passing said displacing liquid under pressure countercurrent to the mass, allowing the second named liquid to displace the concentrated liquid, and withdrawing the concentrated liquid near the ingress end of the displacement zone.

2. In the process according to claim 1, withdrawing said concentrated liquid in the region of maximum concentration.

3. In the process according to claim 1, pressing said mass through an elongated displacement zone towards a melting zone, allowing the mass reaching the melting zone to melt, forcing liquid formed by melting countercurrent to the mass.

4. In the process according to claim 3, pressing said mass into the melting zone filled with the displacing liquid to be used, maintaining uniform pressure conditions in the melting zone, allowing the mass reaching the melting zone to exert pressure on the displacing liquid in the melting zone and to force a part of the liquid countercurrent to the mass, and allowing surplus [water] *liquid* to be removed from the melting chamber.

5. Apparatus for concentrating liquids out of weak dilutions, comprising a tube, means to move through the tube a finely divided mass of crystals obtained from the diluent by freezing out of the concentrated liquid, slots provided in a portion of the wall of the tube for the discharge of the concentrated liquid, said slots being provided between the ends of the tube, a melting chamber associated with the tube at its outlet end, and a heating device in the melting chamber.

6. In the apparatus according to claim 5, a pressure air vessel being in communication with the melting chamber and being provided with an outlet pipe, and a spring-loaded relief valve being provided in said outlet pipe.

7. In the apparatus according to claim 5, the melting chamber being provided with an outlet pipe, said pipe being equipped with a spring-loaded relief valve.

8. In the process according to claim 1, subjecting said mass to the displacement action at a temperature below the [freeing] *freezing* point of the displacing liquid to be used, and introducing the displacing liquid at a temperature slightly above its freezing point.

9. In the process according to claim 8, subjecting a finely divided mass of ice crystals and of the concentrated liquid to the displacement action at a temperature between about minus 1 to minus 25° C., and introducing water as the displacing liquid at a temperature slightly above 0° C.

*10. A process for recovering a concentrated liquid from a liquid mixture containing a crystallizable substance, which comprises preparing a mass of crystals of said crystallizable substance and of concentrated liquid, moving said crystals as a continuous compacted mass through a confined displacement zone, introducing a displacing liquid at the exit end of said confined displacement zone, passing said displacing liquid countercurrent to and through said continuous compacted mass under the displacement pressure being exerted by the advancing compacted mass through said confined displacement zone, and withdrawing the concentrated liquid and the displacing liquid from said displacement zone.*

*11. A continuous process for recovering a concentrated liquid from a liquid mixture containing a crystallizable substance, which comprises preparing a mass of crystals of said crystallizable swbstance and of concentrated liquid, continuously pressing said crystals as a continuous compressed mass through a confined elongated displacement zone toward a melting zone, melting in the melting zone the crystal mass reaching the melting zone, forcing liquid formed by melting countercurrent to and through said continuous compressed mass under the displacement pressure being exerted by the advancing compressed mass, withdrawing concentrated liquid from the displacement zone, and withdrawing liquid formed by melting from the melting zone.*

*12. A process for the separation of one component from a liquid solution, said component being capable of being removed by a crystallization operation, which comprises converting a portion of said component to crystals, passing a resulting mixture of crystals and uncrystallized liquid into an elongated confined displacement zone, separating near the inlet end of said displacement zone a liquid from said crystals, forcing through said displacement zone a continuous compressed mass of said crystals extending through said displacement zone to the other end of said zone, melting crystals at said other end of said displacement zone, removing a portion of the resulting melt, and forcing a further portion of the resulting melt under a superatmospheric* pressure resulting from the forced movement of said compressed mass of crystals through said displacement zone and through and countercurrent to said compressed mass of crystals.

13. A process for purifying an impure crystalline material, which comprises forcing an elongated compressed mass of impure crystals through an elongated confined displacement zone toward a melting zone at one end thereof, melting crystals in said melting zone, removing a portion of the resulting melt, forcing a further portion of the resulting melt through said displacement zone and through and countercurrent to said compressed mass of crystals by pressure displacement resulting from the movement of said compressed mass of crystals, and removing the resulting liquid together with said impurities from said displacement zone.

14. A continuous process for recovering a component of a liquid mixture, which comprises cooling said liquid mixture and forming therein crystals of a component thereof, continuously introducing into an ingress end of a confined displacement zone a mixture of resulting crystals and accompanying liquid, compressing said crystals into a continuous compact mass in said displacement zone and forcing said continuous compact mass of said crystals through said displacement zone toward a melting zone, withdrawing a liquid from said ingress end of said displacement zone, melting crystals in said melting zone, continuously withdrawing a portion of said melt, and continuously forcing under a superatmospheric pressure a further portion of said melt countercurrently through said continuous mass of crystals toward said ingress end.

15. A continuous process for removing water from an aqueous material, which comprises freezing said aqueous material and forming a mass of ice particles and concentrated aqueous medium, introducing a resulting mass of ice particles and concentrated aqueous medium into a displacement zone, withdrawing from said displacement zone concentrated aqueous medium, compressing said mass of ice particles in said displacement zone and moving a resulting continuous compressed mass of ice particles through said displacement zone toward a melting zone, melting ice in said melting zone, withdrawing a portion of the resulting water from said melting zone, and forcing a further portion of the resulting water from said melting zone under a superatmospheric pressure through and countercurrent to the continuous mass of ice crystals in said displacement zone.

16. A process for concentrating an aqueous solution, which comprises subjecting an aqueous solution to a freezing action and forming a mass of finely divided ice and resulting concentrated aqueous solution, pressing said ice as a compressed mass of finely divided ice through a confined elongated displacement zone toward a melting zone, melting ice in the melting zone, forcing water from said melting zone countercurrent to and through said compressed mass under the displacement pressure being exerted by the advancing compressed mass, withdrawing a concentrated aqueous solution from said displacement zone, and separately withdrawing water from said melting zone.

17. A process for removing water from fruit juice, which comprises freezing said fruit juice to form a mixture of ice and concentrated fruit juice, introducing resulting ice and concentrated fruit juice into a confined displacement zone, withdrawing from said displacement zone concentrated fruit juice, compressing said ice into a continuous compact finely divided mass which extends through said displacement zone and forcing resulting compressed ice through said displacement zone toward a melting zone, melting ice in said melting zone, withdrawing a portion of the resulting water from said melting zone, and forcing by the displacement pressure of said compact ice mass a further portion of the resulting water from said melting zone through and countercurrent to said continuous compressed ice mass in said displacement zone.

18. A process of concentrating an aqueous solution, comprising subjecting an aqueous solution to a freezing action, thereby forming ice and concentrating the solution, preparing a mass of finely divided ice so obtained and of the concentrated solution, forcing said finely divided ice as a continuous compressed mass through a confined displacement zone at a temperature between about minus 1 to minus 25° C., introducing water at a temperature slightly above 0° C. into said mass at the exit end of the displacement zone, passing said water through and countercurrent to said ice mass under a superatmospheric displacement pressure, allowing said water to displace the concentrated solution, and withdrawing the concentrated solution near the ingress end of the displacement zone.

19. Apparatus for concentrating liquids, comprising a tube, means to move through the tube a compressed mass of crystals obtained from a solution by freezing and which compressed mass of crystals extends continuously through said tube, means for the discharge of a concentrated liquid from said tube, a melting chamber associated with the tube at its outlet end, and an outlet in communication with said melting chamber.

20. Apparatus for crystal purification comprising a tube, a melting chamber in communication with one end of said tube, a liquid outlet from said melting chamber, an inlet entering the opposite end of said tube, a piston in said opposite end of said tube adapted to compact a mass of crystals and force a resulting compacted mass of crystals toward said melting chamber, and a liquid outlet from said tube removed from said melting chamber for withdrawing liquid substantially free from crystals.

21. Apparatus which comprises a tube, a melting chamber associated with one end of said tube, means for supplying heat to said melting chamber, a first liquid outlet associated with said melting chamber, means for introducing crystals into said tube at a point removed from said melting chamber, a reciprocating piston within said tube and removed from said melting chamber, and a second liquid outlet adjacent and ahead of said reciprocating piston at its point of furthest entry into said tube.

22. Apparatus for crystal purification comprising a tube, a melting chamber in communication with one end of said tube, a liquid outlet from said melting chamber, an inlet entering the opposite end of said tube, means in said opposite end of said tube to compact crystals into a compacted mass which fills said tube and to force a resulting compacted mass of crystals toward said melting chamber, and a liquid outlet from said tube for withdrawing liquid substantially free from crystals.

23. Apparatus for purifying crystals which comprises a heating chamber provided with a liquid outlet, a displacement tube in communica-

*tion with said heating chamber, means for introducing crystals into said tube, and means for forcing said crystals as a compacted mass through said displacement tube into said heating chamber whereby melt in said heating chamber is displaced through said compacted mass, and means in communication with said tube and removed from said heating chamber for withdrawing said melt after it has passed through at least a portion of said compacted mass.*

JOACHIM SCHMIDT.

References Cited in the file of this patent or the original patent

UNITED STATES PATENTS

| Number | Name | Date |
|---|---|---|
| 761,387 | Monti | May 31, 1904 |
| 925,820 | Monti | June 22, 1909 |
| 940,644 | Monti | Nov. 16, 1909 |
| 2,324,869 | Oman | July 20, 1943 |
| 2,540,977 | Arnold | Feb. 6, 1951 |
| 2,617,273 | Findley | Nov. 11, 1952 |
| 2,632,314 | Vance | Mar. 24, 1953 |